United States Patent [19]

Umetani et al.

[11] Patent Number: 5,338,800

[45] Date of Patent: Aug. 16, 1994

[54] PLURAL LIQUID PACK TYPE HEAT-CURABLE RESIN COMPOSITION AND PROCESS FOR PRODUCING SHAPED RESIN ARTICLE THEREFROM

[75] Inventors: Hiroyuki Umetani; Takeyoshi Yamada, both of Iwakuni, Japan

[73] Assignee: Teijin Limited, Osaka, Japan

[21] Appl. No.: 62,732

[22] Filed: May 18, 1993

Related U.S. Application Data

[63] Continuation of Ser. No. 876,423, Apr. 30, 1992, abandoned.

[30] Foreign Application Priority Data

| | | | |
|---|---|---|---|
| May 1, 1991 | [JP] | Japan | 3-126462 |
| Dec. 20, 1991 | [JP] | Japan | 3-354456 |

[51] Int. Cl.$^5$ ............................................. C08F 8/30
[52] U.S. Cl. .................................... 525/126; 525/131; 525/903
[58] Field of Search ......................... 525/126, 131, 903

[56] References Cited

U.S. PATENT DOCUMENTS

| | | | |
|---|---|---|---|
| 4,098,733 | 7/1978 | Olstowski | 525/131 |
| 4,162,357 | 7/1979 | Kubens et al. | 528/67 |
| 4,480,079 | 10/1984 | Orton et al. | 526/301 |
| 5,142,050 | 8/1992 | Endo et al. | 544/221 |

FOREIGN PATENT DOCUMENTS

| | | |
|---|---|---|
| 9100934 | 11/1990 | Brazil . |
| 0052474 | 5/1982 | European Pat. Off. . |
| 0445837A3 | 9/1991 | European Pat. Off. . |
| 50-39400 | 4/1975 | Japan . |
| 53-31515 | 9/1978 | Japan . |

*Primary Examiner*—John Kight, III
*Assistant Examiner*—Rachel Johnson
*Attorney, Agent, or Firm*—Sughrue, Mion, Zinn, Macpeak & Seas

[57] ABSTRACT

One of the objects of the present invention is to produce a shaped article of a cured resin having well-balanced heat resistance and toughness by using a plural liquid pack type heat-curable resinous composition of a low liquid viscosity and excellent handling property with good storage stability. As claimed in the present invention, individual components comprising a polyisocyanate compound (a), a radically polymerizable unsaturated monomer compound bearing no functional group reactive with isocyanate, for example, styrene or a (meth)acrylic acid derivative (b), a polyol compound bearing no radically polymerizable unsaturated bond such as a polyether polyol (c), a radical catalyst (e) and a ring-forming catalyst (d) are separated into 2 liquid packs or 3 liquid packs, and they are mixed on molding, fed into the mold, and reaction-cured in the mold to give a shaped article of a cured resin of excellent heat resistance, toughness and other properties.

9 Claims, No Drawings

PLURAL LIQUID PACK TYPE HEAT-CURABLE RESIN COMPOSITION AND PROCESS FOR PRODUCING SHAPED RESIN ARTICLE THEREFROM

This is a continuation of application Ser. No. 07/876,423 filed Apr. 30, 1992, which is now abandoned.

BACKGROUND OF THE INVENTION

1) Field of the Invention

The present invention relates to a plural liquid pack-type heat-curable resinous composition, and a process for producing a shaped resin article therefrom. More particularly, the present invention relates to a plural liquid pack type heat-curable resinous composition having a low viscosity, being curable at a relatively low temperature, having an excellent storage stability, handling properties and moldability, and being used for producing a shaped resin article having a superior heat resistance, chemical resistance, and mechanical strength, and relates to a process for producing a shaped resin article therefrom with high reproducibility and stability.

2) Background of the Invention

Due to recent technological developments, various new types of resinous materials having excellent heat resistance, mechanical properties, and moldability are now in demand.

Among these new resinous materials, the most noticeable is a reaction-molding type resin comprising a reactive monomer or oligomer. This reaction-molding type resinous material is a heat-curable resinous material having a relatively low viscosity, preferably being in the state of a liquid at room temperature, and capable of being simultaneously molded and cured (hardened or polymerized).

The heat-curable resinous materials include polyurethne resins, expoxy resins, unsaturated polyester resins, polyvinylester resins and polydicyclopentadtene resins. Some of the above-mentioned resinous materials already have been commercially produced and marketed.

These resins have, however, both merits and demerits, for example, a polyurethane resin has low heat resistance and unsatisfactorily low viscosity, because oligomers are used as the isocyanate and/or polyol components. An epoxy resin is superior to polyurethane in heat resistance, but its viscosity is high and the reactivity is not always satisfactorily high. An unsaturated polyester resin is hard and brittle, an epoxy(meth)acrylate is low in heat resistance, and both of them are not always low in viscosity.

Moreover, the urethane (meth)acrylates described in Japanese Patent Laid-open No. Tokkaisho 57-182312Specification (corresponding to U.S. Pat. No. 4,480,079) can lower its liquid viscosity by use of a reactive diluent, but suitable balance between its heat resistance, toughness, molding shrinkage and other properties are not well established.

Japanese Patent Publication No. Tokkosho 53-31515 discloses a process for producing a polymerizable resin which is characterized by reaction between a polyisocyanate and an acrylic ester or β-alkylacrylic ester bearing an epoxy group. In the process, the isocyanate groups and the epoxy groups are preliminarily allowed to react whereby oxazolidone rings are formed to give a polymerizable resin, then a radical catalyst is added to polymerize the remaining vinyl groups to give a thermosetting resin. Thus, the polymerizable resin is unsuitable for reactive molding because of its high viscosity.

In the meantime, Japanese Patent Laid-open No. Tokkaisho 50-39400 discloses copolymerization of polyisocyanates with ethylenically unsaturated compounds. The product according to the process can lower the viscosity of the resin composition and give a cured resin of high heat resistance, but its toughness is not always high, giving a hard and ductile resin.

Japanese Patent Publication No. Tokkosho 61-31129 (corresponding to U.S. Pat. No. 4,162,357) describes a production process for a synthetic resin bearing isocyanurate rings by polymerization of a polyisocyanate including 2,4'-diisocyanate diphenylmethane in the presence of a polymerizable, olefinically unsaturated monomer, and/or an epoxy compound and/or a compound having hydrogen atoms reactive with isocyanates. But, the process according to the specification causes poor storage stability and troubles such as difficult molding because defoaming becomes impossible, when a catalyst system capable of curing within 1 second is used. All of the examples described in the above-stated Japanese Patent Publication No. Tokkyosho 61-31129 (corresponding to U.S. Pat. No. 4,162,357) contain epoxy compounds, but their reactivity is low and the epoxy groups remain unreacted unless they are exposed to a temperature higher than 140° C. for more than a certain time, and adverse effects influence a variety of physical properties of the molded products and cause problems such as increased viscosity of the composition.

SUMMARY OF THE INVENTION

Therefore, the object of the present invention is to provide a liquid curable resinous composition suitable for a reactive resin with low viscosity, high reactivity, high storage stability and excellent handling property, and a shaped resin article therefrom.

According to the present invention the object mentioned above is attained by a plural liquid pack type heat-curable resinous composition comprising a polyisocyanate compound (a), a radically polymerizable unsaturated monomer bearing no functional group reactive with an isocyanate group (b), a polyol compound bearing no radically polymerizable unsaturated bond (c), further a ring-forming catalyst (d) and a radical catalyst (e) in which the individual components are separated into liquid A and liquid B, and the process for preparation of a shaped resin article by introducing the polyisocyanate compound (a), the radically polymerizable unsaturated monomer (b), a polyol compound (c) into a mold, and allowing them to react in the copresence of a ring-forming catalyst (d) and a radical catalyst (e).

DESCRIPTION OF THE PREFERRED EMBODIMENTS

In other words, the plural liquid pack type heat-curable resinous composition according to the present invention is characterized by comprising liquid A containing, preferably essentially consisting of at least one a polyisocyanate compound (a) and liquid B containing, preferably essentially consisting of at least one a radically polymerizable unsaturated monomer bearing no functional group reactive with isocyanate group (b), at least one a polyol compound bearing no radically polymerizable unsaturated bond (c) and at least one a ring-forming catalyst (d), and at least one of a radical catalyst (e) is included in the liquid A and/or the liquid B.

When the composition according to the present invention contains the radical catalyst (e) in the liquid B, it is preferable that the liquid B is separated into the first liquid B (i) containing, preferably essentially consisting of the ring-forming catalyst (d) and the radically polymerizable unsaturated monomer (b) and the second liquid B (ii) containing, preferably essentially consisting of the radical catalyst (e) and the polyol compound bearing no radically polymerizable unsaturated bond (c).

In the composition, it is preferable that the polyisocyanate compound (a) and the polyol compound (c) are present at a ratio of 5 to 75 equivalents of the hydroxyl group the polyol compound bearing no radically polymerizable unsaturated bond (c) to 100 equivalents of the isocyanate group in the polyisocyanate compound (a), and the radically polymerizable unsaturated monomer (b) is preferably in the range of from 5 to 150 parts by weight per 100 parts by weight of the total amount of the polyisocyanate compound (a) plus the polyol compound (c) both of which are in the range defined above.

Further, the process for preparation according to the present invention comprises a process for producing a shaped resin article from the plural liquid pack type heat curable resin composition, comprising the steps of:

mixing the liquid A with the liquid B to provide a liquid resinous mixture;

immediately feeding the liquid resinous mixture into a mold;

heat-curing the liquid resinous mixture in the mold; and taking the resultant shaped resin article out of the mold.

The preferable plural liquid pack type heat-curable resinous composition essentially consists of individual reactive components, namely a polyisocyanate compound (a), a radically polymerizable unsaturated monomer (b) and a polyol compound (c) and individual catalyst components, namely a ring-forming catalyst (d) and a radical catalyst (e).

The components (a) to (c) will be described in detail individually.

The polyisocyanate compound (a) to be used in the present invention is an aliphatic, alicyclic or aromatic polyisocyanate which has at least 2 isocyanate groups, preferably 2 to 5 isocyanate groups and preferably remains in the liquid state at 100° C., particularly preferably at room temperature.

As an aliphatic polyisocyanate, are cited, for example. hexamethylene diisocyanate, 2,2,4- or 2,4,4-trimethylhexamenthylene 1,6-diisocyanate and the like. The alicyclic polyisocyanate is, for example, isophorone diisocyanate, 4,4'-dicyclohexylmethane diisocyanate, hydrogenated m- or p-xylylene diisocyanate and others. The aromatic polyisocyanate is, for example, 2,4-tolylene diisocyanate or 2,6-tolylene diisocyanate, 4,4'-diphenylmethane diisocyanate, 3,4'-diphenylether diisocyanate or 4,4'-diphenylether diisocyanate, 1,5-naphthalene diisocyanate, m-xylylene diisocyanate or p-xylylene diisocyanate and others.

Further, polyphenylenepolymethylene polyisocyanate which is obtained by converting a polyamine, a product from a condensation reaction of aniline with formalin, to a polyisocyanate compound by the reaction with phosgene, or carbodiimide-modified or polyol-modified polyisocyanates can be also employed. Additionally, an isocyanurate ring-containing polyisocyanate, for example, a terpolymer of diisocyanate compounds having at least one isocyanurate ring structure. i.e., a terpolymer of tolylene diisocyanate also can be used.

Among them, a carbodiimide-4,4'-diphenylmethane diisocyanate or polyol-modified 4,4'-diphenylmethane diisocyanate, polyphenylenepolymethylene polyisocyanate, 2,4-tolylene diisocyanate or 2,6-tolylene diisocyanate or the like in the liquid form with a lower viscosity than ca. 25 poise at room temperature is particularly preferred.

These polyisocyanate compounds (a) may be used alone or in combination.

Component (b) to be used in the present invention is a radically polymerizable unsaturated monomer which bears no functional group reactive with an isocyanate group.

A functional group reactive with an isocyanate group means here aliphatic or alicyclic hydroxyl, carboxyl, amino, and epoxy groups or the like. If an unsaturated monomer bearing such a functional group is used, the unsaturated groups radically polymerize and the functional groups react with isocyanate groups to increase cross-linking density resulting in a brittle cured resin, liberation of gas in the reaction with isocyanate, and additionally the problem of lowered storage stability occurs, when the composition is separated into 2 liquid packs to transfer a part of the monomer to the isocyanate-containing pack for adjusting the viscosity and the component proportions.

Preferred examples of the component (b) are (i) styrene represented by the following formula

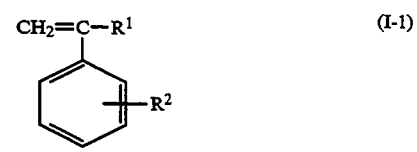
(I-1)

wherein $R^1$ represents a hydrogen atom or a methyl group, $R^2$ represents a hydrogen atom, an alkyl group having 1 to 4 carbon atoms, a halogen atom or a group of the formula

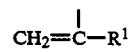

(ii) (meth)acrylates represented by the following formula

(I-2)

wherein $R^3$ represents a hydrogen atom or a methyl group, and $R^4$ represents an alkyl group having 1 to 20 carbon atoms or a tetrahydrofurfuryl group, (iii) vinyl acetate, (iv) (meth)allyl aromatic polycarboxylate, (v) an unsaturated compound having an isocyanuric acid skeleton, (vi) triallyl trimeritate, (vii)

maleimide, (viii) allyl imide and (ix) a polyfunctional (meth)acrylic derivatives.

The styrenes of formula (I-1) described in (i) above are, for example, styrene, α-methylstyrene, t-butyl-styrene, chlorostyrene, vinyltoluene, divinylbenzene or the like.

The acrylic acid derivatives or methacrylic acid derivatives of formula (I-2) described in (ii) above are, for example, esters of acrylic acid or methacrylic acid with an aliphatic or alicyclic alcohol such as methyl alcohol, ethyl alcohol, propyl alcohol, butyl alcohol, octyl alcohol, hexanol, lauryl alcohol, tridecyl alcohol, stearyl alcohol cyclohexyl alcohol, benzyl alcohol, tetrahydrofurfuryl alcohol or the like.

As an example of (metha)allyl aromatic polycarboxylate described in (iv) above, are cited, for example, diallyl phthalate or di(meth)allyl iso-phthalate.

The unsaturated compound bearing an (iso)cyanuric acid skeleton (v) is, for example, tri(meth)allyl (iso)-cyanurate, or trivinyl (iso)cyanurate.

The polyfunctional (meth)acrylic acid derivative (ix) is, for example, alkylene glycol di(meth)acrylate or trimethylolpropane tri(meth)acrylate.

As a component (b) according to the present invention, particularly preferably used are the above-stated styrenes, acrylic acid derivatives or methacrylic acid derivatives. Especially, the acrylic acid or methacrylic acid derivative of formula (I-2) wherein $R^4$ is an alkyl of 4–20 carbon atoms is preferably used because the toughness of the shaped articles is improved.

The component (b) described above can be used alone or in combination of 2 or more. For example, the combination of styrenes with (meth)acrylic acid derivatives improves the radical polymerizability.

The polyol compound (c) used according to the present invention is liquid at 100° C. with an average molecular weight of 300 to 7,000 and has 2 or more, preferably 2 to 3 aliphatic and/or alicyclic hydroxyl groups in the molecule, bearing no radically polymerizable unsaturated bond. It is not preferable for the polyol compound to have radically polymerizable unsaturated bonds, because crosslinking occurs in the part and this lowers the toughness of the shaped cured resin.

Those polyol compounds (c) include (i) polyether-polyol compounds, for example, polyethylene glycol, polypropylene glycol, polytetramethylene glycol and polyol compounds that are addition products of aromatic polyols, for example, bisphenol A, with ethylene oxide or propylene oxide, addition products of propylene glycol with ethylene oxide, addition products of a member selected from glycerol, pentaerytheritol, sorbitol, trimethylolpropane, and N-substituted diethanolamine with at least one member selected from ethylene oxide and propylene oxide;

(ii) polyester polyol compounds, for example, adipate polyol compounds, phthalate polyol compounds, polycaprolactone polyol compounds and polycarbonate polyol compounds;

(iii) polymeric polyol compounds having repeated units, for example, polyetherpolyesterpolyol and polyetherpolyamidepolyol compounds;

(iv) ethylene glycol, propylene glycol, 1,3-butanediol dipropylene glycol, 1,4- and 1,5-hexanediol glycerol and pentaerythritol, sorbitol, trimethylolpropane, N-monoaromatic, cycloaliphatic and aliphatic radical-substituted diethanolamine, and hydrogenated bisphenol A: and cyclohexanediol and cyclohexanedimethanol;

(v) polybutadiene derivatives, butadiene-styrene copolymer derivatives and butadiene-acrylonitrile copolymer derivatives each having terminal hydroxyl groups.

The polyol compounds (c) can be employed alone or as a mixture of 2 or more thereof. Preferably, the polyol compounds (c) are present in the mixed state, to ensure an effective control of the heat resistance and impact strength of the resultant shaped resin article, or to obtain a balanced moldability or reactivity of the resultant resinous composition.

Among such polyol compounds, a polymer of some extent of polymerization degree is preferred from the view point of impact strength, while a combination of polyether polyol, as a major component, with other polyol compounds is preferably used for heat resistance and water resistance. Further, a polyol which is liquid or in an almost liquid state at room temperature is suitably used for favorable moldability.

In the present invention, the cured resin is improved in heat resistance by cyclic trimerization of isocyanate into an isocyanurate ring, and simultaneously the polyol compound (c) is allowed to react with isocyanate to form a urethane structure to introduce soft segments whereby the toughness is upgraded.

When components (a), (b) and (c) are used in combination, the proportions of the individual components are selected so that the hydroxy group in the polyol compound (c) may reach 5 to 75 equivalents, preferably 7 to 60 equivalents, particularly preferably 9 to 50 equivalents based on 100 equivalents of the isocyanate group in the polyisocyanate compound (a), and the unsaturated monomer (b) is adjusted to 5 to 150 parts by weight, preferably 7 to 120 parts by weight, particularly preferably 9 to 100 parts by weight per 100 parts by weight of the total of the polyisocyanate (a) and the polyol compound (c) defined in the above-stated range.

Deviation from the above-defined ranges is undesirable because problems may occur In some cases such as lowered physical properties of the resultant cured resin or worsened moldability due to increased liquid viscosity.

In addition to components (a), (b) and (c), another compound reactive with (a) and/or (b) and/or (c) can be employed as a fourth component for improving physical properties and the like.

Such a compound is preferably a polyamine compound which reacts with the isocyanate groups in component (a) to form urea bonds whereby the mechanical properties of the cured resin are improved, a polyepoxy compound which reacts with the isocyanate groups to form oxazolidone rings whereby heat-resistant skeletons are introduced to increase the mechanical properties and heat resistance, a cyclic imino ether compound which reacts with the hydroxyl groups in component (c) to increase the mechanical properties, and an unsaturated monomer bearing functional groups reactive with epoxy (meth)acrylate and isocyanate groups to improve the radical polymerizability and the mechanical properties. Among them, it is desirable to add an epoxyacrylate and an unsaturated monomer bearing functional groups reactive with an isocyanate group because the reactivity is suppressed and the mechanical properties are upgraded.

The amount of such a component to be used is suitably less than 2 parts by weight, preferably 0.1 to 1.8 part by weight, per 100 parts by weight of the total of the polyisocyanate (a) and the polyol (c). As long as the amount is in this range, the addition can favorably control the reactivity and increase the mechanical properties of the cured resin without any adverse effect on the other properties such as the viscosity of the composition.

The heat-curable resinous composition according to the present invention contains a radical catalyst (e) and a ring-forming catalyst (d) as essential components, in addition to the above-stated components (a), (b) and (c).

The radical catalyst (e) can be in the form of liquid(s) A and/or B and preferably comprises at least one member selected from organic peroxide compounds and organic azo compounds.

The organic peroxide compounds usable for the present invention Include:

ketone peroxide, for example, methyl ethyl ketone peroxide, cyclohexanone peroxide, and methyl isobutyl ketone peroxide;

organic hydroperoxide compounds, for example, cumen hydroperoxide, and tertiary butyl hydroperoxide;

peroxyester compounds, for example, tertiary butyl peroxyoctoate and tertiary butyl peroxybenzoate;

dialkyl peroxide compounds, for example, 1,3-bis(-tert.-butylperoxyisopropyl)benzene, dicumylperoxide, and tris(tert.-butylperoxy)triazine;

diacylperoxide compounds, for example, isobutyryl peroxide, lauroyl peroxide and benzoyl peroxide;

peroxyketal compounds, for example, 1,1-di-tert.-butylperoxy cyclohexane, 2,2-di(tert.-butylperoxy)butane; and peroxycarbonate compounds, for example, tert.-butylperoxyisopropyl carbonate, bis(4-tert.-butylcyclohexyl)peroxydicarbonate, di-3-methoxybutylperoxy dicarbonate.

The organic azo compound usable for the present invention includes azobisalkanonitrile compounds, for example. azobisisobutyronitrile and azobiscarbonamide.

The radical catalyst (c) comprises only one of the above-mentioned compounds or a mixture of two or more thereof.

In the resinous composition of the present invention, the radical catalyst (e) is preferably present in a total amount of 0.05 to 15 %, more preferably 0.1 to 10%, still more preferably 0.2 to 5%, based on the total weight of ethylenically unsaturated compounds.

To the radical catalyst (e) is optionally added a small amount of a polymerization-promoting agent comprising at least one organic acid salt of a multivalent metal, for example, an octylic acid salt or naphthenic acid salt of a heavy metal, for example, cobalt, manganese, iron, or copper, and the like and at least one tertiary amine compound, if necessary, for example, dimethylaniline or dimethyl-p-toluidine; and/or a polymerization inhibitor comprising at least one member selected from hydroquinone, naphthoquinone, tert.-butylcatecol, p-benzoquinone, butylated hydroxytoluene and nitroxide radical compounds. These additives are used to control the curing reaction rate and pot-life, of the resinous composition.

Preferably, the ring-forming catalyst (d) comprises at least one member selected from the group consisting of tertiary amine compounds, imidazole compounds, morpholine compounds, hexahydro-s-triazine compounds, diazabicyclo compounds and quaternary ammonium salt compounds.

The tertiary amine compounds include, for example, triethylamine, benzyldimethylamine, N,N-dimethylaniline, N,N-dimethyl-p-toluidine, N,N'-dimethylpiperazine, N-glycidyl-N,N-dimethylamine, 2,4,6-tris(dimethylaminomethyl)phenol, pyridine, N,N,N',N'-tetraglycidyimethylene-dianiline, 1-(N,N-diglycidylamino)-4-glycidyloxybenzene, N,N,N',N'-tetraglycidyl-m-xylylenediamine and N,N,N',N'-tetraglycidyl-p-xylylenediamine.

The imidazole compounds include, for example, imidazole, 2-methylimidazole, 2-ethyl-4-methylimidazole, and 1-cyanoethyl-2-ethyl-4-methylimidazole.

The morpholine compounds include, for example, N-methylmorpholine.

The hexahydro-s-triazine compounds include, for example, N,N',N"-tris(dimethylaminopropyl)hexahydro-s-triazine.

The diazabicyclo compounds include, for example, 1,8-diazabicyclo[5,4,0]-7-undecene and 1,4-diazabicyclo[2,2,2]octane.

As a quaternary ammonium salt, the compound of formula (II)

wherein $R^5$ to $R^8$ are identical or different from one another, and represent aliphatic hydrocarbon groups of 1 to 20 carbon atoms, or alicyclic hydrocarbon groups of 6 to 12 carbon atoms or aromatic hydrocarbon groups of 6 to 12 carbon atoms wherein the total number of the carbon atoms included in the substituents represented by $R^5$ to $R^8$ is 12 or more, and X represents halogen, is used.

$R^5$ to $R^8$ in formula (II) are, for example, methyl, ethyl, propyl, butyl, decyl, tetradecyl, benzyl, cyclohexyl, phenyl or the like. But, the total carbon atom number should be 12 and more because less than 12 carbon atoms in the substituents of $R^5$ to $R^8$ make the solubility poor thereby causing heterogeneity of the composition system.

In formula (II), X represents halogen, namely iodine, bromine, chlorine or fluorine and fluorine is preferably used because the curing reaction is not too rapid and not too slow, keeping an appropriate curing rate in the case of the curing temperature at 150° C. or lower.

The quaternary ammonium salts are, for example, tetrabutylammnoium iodide, tetrabutylammoniium bromide, tetrabutylammonium chloride, tetrabutylammonium fluoride, benzalkonium chloride, benzyldi(2-hydroxyethyl)methylammonium chloride, or decyldi(2-hydroxyethyl)methylammonium bromide.

It is a matter of course that the ring-forming catalyst (d) can be used alone, but a mixture of 2 or more thereof can be also used for controlling the reactions.

The amount of the ring-forming catalyst (d) to be used is 0.001 to 10 parts by weight, preferably 0.005 to 5 parts by weight per 100 parts by weight of the polyisocyanate compound. An excessive amount of the catalyst tends to acclerate the curing reaction too much and cause foaming.

The use of a quaternary ammonium salt as a ring-forming catalyst (d) is practically very effective because it does not interact with the radical catalyst (e) to enable free selection of the radical catalysts with high storage stability even when the ring-forming catalyst (d) and the radical catalyst coexist together in the same liquid.

When the quaternary ammonium salt is used as a ring-forming catalyst, the addition of a small amount of a titanium or tin compound further improves the curing properties to give cured shaped articles with a combination of high heat distortion temperature with high shock resistance. Particularly, the quaternary ammonium salt is very effective when it is used as a catalyst mixed with a tin compound. The tin compound is an organic or inorganic tin compound, for example, stannous chloride or stannic chloride as an inorganic one or di-n-butyltin dilaurate, di-n-butyltin diacerate, tri-butyltin acetate or tetra-n-butyltin as an organic tin compound. Di-n-butyltin dilaurate and di-n-butyltin diacetate are suitably used with good handleability.

When a tertiary amine is used as a catalyst in the present invention, the reaction rate can be increased by adding a catalytic amount of a compound bearing one or more epoxy groups in the molecule and such a process can be suitably applied. In the present invention, an acidic stabilizer can be further added for stabilization of the composition.

In addition to the radical catalyst (e) and the ring-forming catalyst (d), catalysts such as a carbodiimide-forming catalyst, an epoxy-curing accelerator and other kinds of catalysts can be suitably added depending on the fourth component to be added, if necessary.

As for the particularly preferable combination of individual components, the polyisocyanate compound (a) is preferably 4,4'-diphenylmethane diisocyanate and/or tolylene diisocyanate which has been modified so that it keeps its liquid form with a viscosity of less than 25 poise at 25° C.; the radically polymerizable unsaturated monomer (b) bearing no functional group reactive with isocyanate groups is preferably styrene, α-methylstyrene or alkyl (meth)acrylate and the polyol compound (c) is preferably polyether polyol or polyester polyol, and the radical catalyst (e) and the ring-forming catalyst (d) can be suitably selected depending on the desired reaction conditions (reaction temperature and time).

It is undesirable to mix and store the polyisocyanate compound (a) and the polyol compound (b) because they react with each other gradually, even in the absence of a catalyst. In the present invention, therefore, individual components and catalysts are separated into liquid A containing, preferably essentially consisting of, a liquid polyisocyanate compound (a) and liquid mixture B containing, preferably essentially consisting of, the unsaturated monomer (b), the polyol compound (c) and the ring-forming catalyst (d), and further, the radical catalyst (e) is added to at least one of liquid A and liquid B to prepare two kinds liquids separately stored. Upon use, the liquid should be mixed rapidly, and immediately before molding or at the time as molding, the mixture should be poured into a prescribed mold and reacted and cured. Alternatively, individual components and catalysts are divided into 3 groups; liquid polyisocyante compound (a) as a liquid A, a liquid mixture containing, preferably essentially consising of, the ring-forming catalyst (d) and the unsaturated monomer (b) as a liquid B (i), and another liquid mixture containing, preferably essentially consisting of, the polyol compound (c) and the radical catalyst (e) as liquid B (ii), and they are all mixed at once or preliminarily the liquid B (i) and the liquid B (ii) are mixed to prepare liquid B, then the liquid B is rapidly mixed with liquid A, poured in the mold and reacted and cured in the mold. These processes are preferred from the view point of the storage stability of the liquids.

In other words, the present invention provides the following processes:

A process for producing a shaped resin article from the above-noted plural liquid pack type heat curable resin composition comprising the steps of:

mixing the liquid A with the liquid B to provide a liquid resinous mixture;

immediately feeding the liquid resinous mixture into a mold;

heat-curing the liquid resinous mixture in the mold; and taking the resultant shaped resin article out of the mold; and A process for producing a shaped resin article from the above-noted plural liquid pack type heat curable resin composition comprising the steps of:

mixing the liquid A with the first liquid B (i) and the second liquid B (ii) of the liquid B to provide a liquid resinous mixture;

immediately feeding the liquid resinous mixture into a mold;

heat-curing the liquid resinous mixture in the mold, and taking the resultant shaped resin article out of the mold.

In the mixing step of the production processes stated above, it is preferable that the first liquid B (i) is mixed with the second liquid B (ii) and the resultant liquid B is mixed with the liquid A.

In the production process according to the present invention, the radical catalyst (e) is accelleratively decomposed with a tertiary amine in some cases, when a liquid mixture of the unsaturated monomer (b), the polyol compound (c) and the ring-forming catalyst (d) is used as a liquid B, especially when the tertiary amine Is used as the ring-forming catalyst (d). Therefore, from the view point of storage stability, the radical catalyst (e) can be added to liquid A or a dialkyl peroxide or peroxy ketal resisting the decomposition by the tertiary amine can be used to enable the radical catalyst (e) to coexist in liquid B.

The preparation process In which liquid B is separated into the first liquid B (i) containing, preferably essentially consisting of, the ring-forming catalyst (d) and the unsaturated monomer (b) and the second liquid B (ii) containing, preferably essentially consisting of, the radical catalyst (e) and the polyol compound (c) is particularly preferred because all of the problems relating to storage stability of the prepared liquids are resolved. In the process, there is no problem of decomposition of the radical catalyst with the tertiary amine and the limitation on the kinds and amounts of the tertiary amine ring-forming catalyst and the radical catalyst are no linger needed. Further, the difficulty in catalyst weighing because of their small amounts can be overcome, as the catalysts are mixed with the unsaturated monomer and the polyol compound and the handlig property is improved.

Further, in order to adjust the weight ratio and the viscosities of the first liquid B(i) and the second liquid B (ii) and improve the handling property of liquid B, a part of the polyol compound (c) may be added to the first liquid or on the contrary, a part of the unsaturated monomer (b) may be transferred to the second liquid B (ii).

There is no limitation on the mixing order, as long as the liquids of 3 kinds are mixed in a very short time, but it is preferred that the 3 liquids are mixed simultaneously or the first liquid B (i) and the second liquid B (ii) of liquid B are mixed in the first step, and then the mixture is mixed with liquid A.

In any of the cases of two liquid pack type or three liquid pack type, the liquids mentioned above are homogeneously mixed by collision mixing or by means of a static mixer, a dynamic mixer or the like immediately before or during the molding to prepare a heat-curable composition, then the composition is directly introduced into the mold of a desired shape to effect the reaction or the reaction is conducted by coating, spraying, dipping or other operations.

The reaction temperature varies depending on the polyisocyanate compound (a), the unsaturated monomer (b), the polyol compound(c), the fourth component which is added, if necessary, and the catalysts (d) and (e), and their mutual ratios, but is preferably 10° to 180° C., more preferably 20° to 160° C., and most preferably 40° to 140° C.

The reaction time should be enough for the resin to cure sufficiently and varies depending on individual components, their proportions, reaction temperature and the like. The time is preferably about 10 seconds to 24 hours, more preferably about 20 seconds to 10 hours, most preferably about 30 seconds to 6 hours.

The reaction can be conducted under normal to elevated pressures. At this time, the reaction is preferably carried out in an atmosphere of an inert gas such as nitrogen, argon or the like in order to avoid air moisture from infiltration and the resin from oxidative deterioration.

According to the present invention, the cured resin shaped articles are produced by reactive curing, but a postcure can be preferably carried out by further healing for improving the heat resistance of the cured resin shaped articles.

The composition according to the present invention can be formed in a customary manner except that the individual liquids are mixed on molding. The molding process is, for example, compression molding, cast molding, reactive transfer molding (RTM), vacuum molding, centrifugal molding, injection molding, reactive injection molding (RIM), and structural RIM (S-RIM). And transfer molding (RTM), reactive injection molding (RIM) and S-RIM are preferably used.

The above-stated heat-curable resinous composition to be cured can contain, if necessary, reinforcing fibers such as thermoplastic polymer fibers, inorganic fibers, carbon fibers, glass fibers, aramid fibers, a variety of fillers, elastomers, pigments, colorants, antioxidants, UV-absorbers, releasing agents, additionally thermoplastic polymers, shrinkage-reducing agents such as bicyclo compounds or spiro compounds, elastomers or the like. For example, a fiber-reinforcing material is previously fabricated into woven fabrics or matts and placed in the mold, and the heat-curable resin composition Is applied thereon. In this case, the reaction between individual components with heat is conducted in the presence of the fiber-reinforcing material and the cured resin is obtained as a resin shaped article containing the reinforcing agent, namely a composite material.

The heat-curable resinous composition according to the present invention has excellent operability and handling property because it is liquid at room temperature, for example, it can be readily cast in the mold or the like with low pressure and shows good impregnation, when reinforcing fibers are employed, and can increase the amount of the filler to be used. Moreover, the reactive-cured resin has the isocyanurate structure formed by the cyclic trimerization of isocyanates (trimeric cyclization) and can give shaped articles of excellent heat resistance, chemical resistance and mechanical properties. Additionally, the resin includes the urethane structure formed by the reaction between isocyanate groups and hydroxy groups and gives shaped articles of high heat resistance and excellent mechanical properties such as toughness.

In the preparation process according to the present invention, a plural liquid pack type resinous composition is allowed to react and cure at the molding step, thus the storage stability is excellent and shaped articles with a variety of excellent properties as operability and handling property are retained.

EXAMPLES

The present invention will now be described by reference to the following examples, but the examples are only for illustration and the present invention is not limited by them.

EXAMPLES 1, 2 AND COMPARATIVE EXAMPLE 1

A carbodiimide-modified 4,4'-diphenylmethane diisocyanate (isocyanate equivalent: $6.90 \times 10^{-3}$ equivalent/g) 426 g was used as liquid A. Separately, a prescribed amount of styrene, given in Table 1, 136 g of a polyether polyol 7:3 weight ratio mixture of a polyether polyol which was prepared by addition polymerization of ethylene oxide onto the terminal hydroxyl groups of glycerol and which had an OIt value of 56 mg KOH/g, and another polyether polyol which was prepared by addition polymerization of ethylene oxide onto the terminal hydroxyl group of polypropylene polyether polyol and which had an OH value of 280 mg KOH/g, 10 g of N,N',N''-tris(dimethylamlnopropyl)-hexahydro-s-triazine and 1 g of t-butylperoxy 2-ethylhexanoate were mixed to prepare a solution as a liquid B. Both of liquids A and B had low viscosity and showed good storage stability with no change in the viscosity even after time-passage over 1 week at room temperature.

The liquids A and B which previously had been vacuum-degassed, were passed through a pipe equipped with a static mixer to effect mixing in the pipe and introduced into a mold having 3 mm thick space between walls, and heated up to 100° C. A formed plate of 3 mm thickness was taken out of the mold after 30 minutes.

An HDT & VSP tester (TOYO SEIKI SEISAKU-SHO, Japan) was used to measure the heat distortion temperature (HDT) and the notched Izod impact strength (N.I. impact strength). The results are given in Table 1, showing that all of the shaped products have high toughness.

For comparison, the composition A and B in example 1 was mixed together and gel was formed within 5 minutes, showing poor storage stability.

TABLE 1

| Example No. | Amounts of styrene (g) | HDT (°C.) | N.I. impact strength (kg · cm/cm) |
|---|---|---|---|
| 1 | 28 | 134 | 5.5 |
| 2 | 225 | 105 | 3.8 |

EXAMPLE 3

A carbodiimlde-modified 4,4'-diphenylmethane diisocyanate (isocyanate equivalent: $6.90 \times 10^{-3}$ equivalent/g) 426 g was used as liquid A. Separately, 35 g of styrene, 171 g of a polyether polyol which was prepared by addition polymerization of ethylene oxide onto the terminal hydroxyl groups of glycerol and had an OH value of 56 mg KOH/g, 6.3 g of N,N',N"-tris-(dimethylaminopropyl)-hexahydro-s-triazine and 0.63 g of t-butylperoxy 2-ethylhexanoate were mixed to prepare a solution as a liquid B. Both of liquids A and B had low viscosity and showed good storage stability with no change in the viscosity even after a time-passage of over 1 week.

The liquids A and B which previously had been vacuum-degassed were passed through a pipe equipped with a static mixer to effect mixing in the pipe and introduced into a mold of 3 mm thick cavity, and heated up to 100° C. A formed plate of 3 mm thickness was taken out of the mold after 30 minutes.

Measurement with the HDT & VSP tester (TOYO SEIKI SEISAKUSHO, Japan) gave the formed plate a 114° C. HDT and a 6.3 kg·cm/cm notched Izod impact strength to show that the cured resin had high heat resistance and high toughness.

The resultant resin was further post-cured at 150° C. for 2 hours and the measurement was carried out similarly to give a 190° C. HDT and a 5.4 kg·cm/cm notched Izod impact strength. Thus, the heat resistance was improved by post-curing with little adverse effect on the toughness.

EXAMPLE 4

A carbodiimide-modified 4,4'-diphenylmethane diisocyanate (isocyanate equivalent: $6.90 \times 10^{-3}$ equivalent/g) 426 g was used as liquid A. Separately, 70 g of styrene and 6.3 g of N,N',N"-tris-(dimethylaminopropyl)-hexahydro-s-triazin were dissolved to prepare liquid B (i), and 136 g of a polyether polyol 7:3 weight ratio mixture of a polyether polyol which was prepared by addition polymerization of ethylene oxide onto the terminal hydroxyl groups of glycerol and which had an OH value of 56 mg KOH/g, and another polyether polyol which was prepared by addition polymerization of ethylene oxide onto the terminal hydroxyl group of polypropylene polyether polyol and which had an OH value of 280 mg KOH/g, and 0.78 g of t-butylperoxy 2-ethylhexanoate were mixed to prepare a solution as a liquid B (ii). All of liquids A, liquid B (i) and liquid B (ii) had low viscosity and showed good storage stability with no change in the viscosity even after a time-passage of over 1 week.

The liquid A, liquid B (i) and liquid B (ii) were previously had been vacuum-degassed, were passed through a pipe equipped with a static mixer to effect mixing in the pipe and introduced into a hot mold of 3 mm thick cavity, and heated up to 100° C. A formed plate of 3 mm thickness was taken out of the mold after 30 minutes.

Measurement with HDT & VSP tester (TOYO SEIKI SEISAKUSHO, Japan) gave the formed plate a 124° C. HDT and a 3.8 kg·cm/cm notched Izod impact strength, and showed that the cured resin had high heat resistance and high toughness.

The resultant resin was further post-cured at 150° C. for 2 hours and the measurement was carried out similarly to give a 186° C. HDT and a 4.2 kg·cm/cm notched Izod impact strength. Thus, the heat resistance was improved by post-curing curing without any adverse effects on the toughness.

EXAMPLE 5

A carbodiimide-modified 4,4'-diphenylmethane diisocyanate (isocyanate equivalent: $6.90 \times 10^{-3}$ equivalent/g) 426 was used as liquid A. Separately, 70 g of styrene, 12.6 g of benzyldimethylamine and 0.6 g of dibutyltin dilaurate were dissolved to prepare liquid B (i), and 136 g of a polyether polyol which was prepared by addition polymerization of ethylene oxide onto the terminal hydroxyl groups of glycerol and had an OH value of 56 mg KOH/g, and 1.4 g of t-butylperoxy 2-ethylhexanoate were mixed to prepare a solution as a liquid B (ii).

All of liquids A, liquid B (i) and liquid B (ii) had low viscosity and showed good storage stability with no change in the viscosity even after a time-passage of over 1 week.

The liquid A, liquid B (i) and liquid B (ii) were vacuum-degassed, passed through a pipe equipped with a static mixer to effect mixing in the pipe and introduced into a hot mold of 3 mm thick cavity, and heated up to 100° C. A formed plate of 3 mm thickness was taken out of the mold after 1 hour.

The plate was measured with a HDT & VSP tester (TOYO SEIKI SEISAKUSHO, Japan) to give a 108° C. HDT and a 3.9 kg·cm/cm notched Izod impact strength, and was confirmed to be a cured resin of high toughness.

The plate was further post-cured at 150+ C. for 2 hours and the measurement was carried out similarly to give 195° C. HDT and 4.2 kg·cm/cm notched Izod impact strength. Thus, the heat resistance was improved by post-curing without any adverse effects on the toughness.

EXAMPLE 6

Four hundred eighty three (483) grams of a polyol-modified 4,4'-diphenylmethane diisocyanate (isocyanate equivalent: $6.29 \times 10^{-3}$ equivalent/g) were used as liquid A. Separately, 62 g of styrene, 136 g of a polyether polyol 7:3 weight ratio mixture of a polyether polyol which was prepared by addition polymerization of ethylene oxide onto the terminal hydroxyl groups of glycerol and had an OH value of 56 mg KOH/g, and another polyether polyol which was prepared by addition polymerization of ethylene oxide onto the terminal hydroxyl group of polypropylene polyether polyol and had an OH value of 280 mg KOH/g, 6.3 g of N,N',N"-tris(dimethylaminopropyl)-hexahydro-s-triazine and 0.63 g of t-butylperoxy 2-ethylhexanoate were mixed to prepare a solution as a liquid B.

Both liquids A and B had low viscosity and showed good storage stability with no change in viscosity even on standing for more than 1 week.

The liquids A and B which previously had been vacuum-degassed, were passed through a pipe equipped with a static mixer to effect mixing in tile pipe and introduced into a mold of 3 mm thick cavity, heated up to 100° C. A formed 3 mm thick plate was taken out of the mold after 30 minutes.

HDT & VSP tester (TOYO SEIKI SEISAKUSHO, Japan) was used to measure HDT and the notched Izod impact strength. The results were a 135° C. HDT and a 5.0 kg·cm/cm Notched Izod impact strength and the cured resin was of high heat resistance and high toughness.

Further, the plate was post-cured at 150° C. for 2 hours and found to have a 182° C. HDT and a 4.3 kg·cm/cm Notched Izod impact strength with heat resistance improved and with little adverse effectd on the toughness.

EXAMPLE 7 to 14

A carbodiimide-modified 4,4'-diphenylmethane diisocyanate (isocyanate equivalent: $6.90 \times 10^{-3}$ equivalent/g) 2.13 g was used as liquid A. Separately, 0.35 g of styrene, 0.68 g of a polyether polyol 7:3 weight ratio mixture of a polyether polyol which was prepared by addition polymerization of ethylene oxide onto the terminal hydroxyl groups of glycerol and had an OH value of 56 mg KOH/g, and another polyether polyol which was prepared by addition polymerization of ethylene oxide onto the terminal hydroxyl group of polypropylene polyether polyol and had an OH value of 280 mg KOH/g, and prescribed amounts of catalysts and reaction-controlling agent shown in Table 2 were dissolved to prepare liquid B.

The viscosities of both liquids A and B were 45 cps and 33 cps at 30° C., respectively and their storage stability was high without any change in the viscosity even on standing over 1 week.

The liquids A and B which previously had been vacuum-degassed, were passed through a pipe equipped with a static mixer to effect mixing in the pipe and introduced into a test tube of 4 mm diameter. The time until the mixture lost its fluidity to form a gel and the time of curing are shown in Table 2 which demonstrates that the reaction can be readily controlled by selecting the catalysts used. The abbreviations for catalyst and reaction controllers in Table 2 correspond to the following compounds:

TDHT: N,N',N''-tris(dimethylaminopropyl)hexahydro-s-triazine,
BPEH: t-Butylperoxy 2-ethylhexanoate,
MEHQ: Monoethylhydroquinone,
TDMAP: 2,4,6-trisdimethylaminophenol,
NMM: N-Methylmorpholine,
NDNA: N,N-Dimethylamlnoethyl methacrylate,
TEA: Triethylamine,
DBU: 1,8-Diazabicyclo[5.4.0]- 7-undecene,
TBAB: Tetra-n-Butylammonium bromide,
BDMA: Benzyldimethylamine,
PBZ: t-Butylperoxy benzoate, and
PD14, 1,3-Bis(t-Butylperoxyisopropyl)benzene.

TABLE 2

| Example No. | Catalysts and Controler amount in g in ( ) | Gel time | Cure time |
|---|---|---|---|
| 7 | TDHT (0.032) BPEH (0.0032) MEHQ (0.0006) | 1' 33" | 2' 40" |
| 8 | TDMAP (0.032) BPEH (0.0032) | 8' 53" | 13' 40" |
| 9 | NMM (0.032) BPEH (0.0032) | 20' 50" | 24' 40" |
| 10 | NDMA (0.032) BPEH (0.0032) | 26' 10" | 29' 50" |
| 11 | TEA (0.032) BPEH (0.0032) | 13' 20" | 17' 50" |
| 12 | DBU (0.032) BPEH (0.0032) | 3' 14" | 5' 00" |
| 13 | TBAB (0.032) BPEH (0.0032) | 22' 25" | 27' 30" |
| 14 | BDMA (0.032) BPEH (0.0016) PBZ (0.0016) | 10' 54" | 12' 25" |

TABLE 2-continued

| Example No. | Catalysts and Controler amount in g in ( ) | Gel time | Cure time |
|---|---|---|---|
| | PD14 (0.0016) | | |

EXAMPLE 15 TO 19

A carbodiimide-modified 4,4'-diphenylmethane diisocyanate (isocyanate equivalent: $6.90 \times 10^{-3}$ equivalent/g), 426 g, was used as liquid A. Separately, a prescribed amount of an unsaturated monomer listed in Table 3, 33 g of a polyether polyol which was prepared by addition polymerization of ethylene oxide onto the terminal hydroxyl groups of polypropylene polyether polyol and which had an OH value of 280 mg KOH/g and 6.3 g of N,N',N''-tris(dimethylaminopropyl)hexahydro-s-triazine were dissolved to prepare liquid B (i), and 41 g of a polyether polyol which was prepared by addition polymerization of ethylene oxide onto the terminal hydroxyl groups of glycerol and which had an OH value of 56 mg KOH/g, 62 g of a polyether polyol which was prepared by addition polymerization of ethylene oxide onto the terminal hydroxyl groups of polypropylene polyether polyol and had an OH value of 280 mg KOH/g and a prescribed amount of t-butyl-peroxy 2-ethyl-hexanoate (BPEH) were mixed to prepare a solution as a liquid B (ii).

All of liquids A, liquid B (i) and liquid B (ii) had low viscosity and showed Good storage stability with no change in the viscosity even after a time-passage of over 1 week.

The liquid A, liquid B (i) and liquid B (ii) were previously vacuum-degassed, were passed through a pipe equipped with a static mixer to effect mixing in the pipe and introduced into a hot mold of 3 mm thick cavity, and heated up to the prescribed temperature given in Table 3. A formed plate of 3 mm thickness was taken out of the mold after 30 minutes.

The HDT and Notched Izod impact strength (N. I.) of formed plates were measured with a HDT & VSP tester (TOYO SEIKI SEISAKUSHO, Japan) and the results are shown in Table 3. All of the resins were confirmed to have well-balanced heat resistance and toughness.

Especially, Examples 17 to 19 revealed that the toughness was largely improved by using a long-chain alkyl methacrylate as an unsaturated monomer.

TABLE 3

| Example No. | Unsaturated monomer (g) | BPEH (g) | Molding temp. (°C.) | HDT (°C.) | N.I. |
|---|---|---|---|---|---|
| 15 | α-methylstyrene (29) | 0.145 | 100 | 135 | 6.4 |
| 16 | methyl methacrylate (112) | 0.560 | 60 | 75 | 6.4 |
| 17 | n-butyl methacrylate (29) | 0.152 | 100 | 123 | 8.7 |
| 18 | lauryl methacrylate (13) tridecanoyl methacrylate (16) | 0.140 | 100 | 112 | 9.1 |
| 19 | n-butyl methacrylate (23) styrene (6) | 0.140 | 100 | 128 | 8.4 |

BPEH: t-butylperoxy 2-ethylhexanoate
N.I.: Notched Inzod Impact Strength (kg · cm/cm).

EXAMPLE 20

A carbodiimide-modified 4.4'-diphenylmethane diisocyanate (isocyanate equivalent: 6.90×10$^{-3}$ equivalent/g), 100 g, was used as liquid A. Separately, 14 g of styrene, 32 g of a polyether polyol 7:3 weight ratio mixture of a polyether polyol which was prepared by addition polymerization of ethylene oxide onto the terminal hydroxyl groups of glycerol and which had an OH value of 56 mg KOH/g, and another polyether polyol which was prepared by addition polymerization of ethylene oxide onto the terminal hydroxyl group of polypropylene polyether polyol and which had an OH value of 280 mg KOH/g, and 0.067g of tetra-n-butylammonium fluoride, 0.013 g of dibutyltin dilaurate, 0.05 of 1,1-di-t-butylperoxy-3,3,5-timethylcyclohexane were dissolved to prepare liquid B.

The viscosities of liquids A and B were 45 cps and 52 cps at 30° C., respectively, and their storage stability was high without any change in the viscosity even on standing over 1 week.

The liquids A and B which previously had been vacuum-degassed, were passed through a pipe equipped with a static mixer to effect mixing in the pipe and introduced into a mold of 3 mm-thick cavity wich was heated up to 70° C. The product was taken out of the mold to give a shaped plate of 3 mm thickness. The plate was post-cured at 150°C. for 2 hours.

The plate was measured with a HDT & VSP tester (TOYO SEIKI Japan) to give a 159° C. HDT and a 5.1 kg- notched Izod impact strength.

EXAMPLE 21 AND 22

A carbodiimide-modified 4,4'-diphenylmethane diisocyanate (isocyanate equivalent: 6.90×10$^{-3}$ equivalent/g) , 100 g, was used as liquid A. Separately, 14 g of styrene, 32 g of a polyether polyol 7:3 weight ratio mixture of a polyether polyol which was prepared by addition polymerization of ethylene oxide onto the terminal hydroxyl groups of glycerol and which had an OH value of 56 mg KOH/g, and another polyether polyol which was prepared by addition polymerization of ethylene oxide onto the terminal hydroxyl group of polypropylene polyether polyol and which had an OH value of 280 mg KOH/g, and prescribed amounts of a unsaturated compound listed In Table 4 and prescribed amounts of catalysts: tetra-n-butylammonium fluoride (TBFA) and dibutyltin dilaurate (DBSn) and 1,1-di-t-butylperoxy-3,3,5-trimethylcyclohexane (BPTC) shown in Table 4 were dissolved to prepare liquid B.

The viscosities of liquids A and B were 45 cps and 52 cps at 30° C., respectively, and their storage stability was high without any change in the viscosity even on standing over 1 week.

The liquids A and B which previously had been vacuum-degassed, were passed through a pipe equipped with a static mixer to effect mixing in the pipe and introduced into a mold of 3 mm-thick cavity wich was heated up to 70° C. The product was taken out of the mold to give a molded plate of 3 mm thickness. The plate was post-cured at 150° C. for 2 hours.

The plate was measured with a HDT & VSP tester (TOYO SEIKI Japan) and the HDT and the notched Izod impact strength (N.I.) are given in Table 4. These data reveal that the cured resins have high heat resistance and high toughness.

TABLE 4

| Example No. | Unsaturated compound (g) | Catalyst (g) | HDT (°C.) | N.I. (kg · cm/cm) |
| --- | --- | --- | --- | --- |
| 21 | glycidyl methacrylate (1.3) | TBAF (0.066) DBSn (0.013) BPTC (0.077) | 161 | 5.3 |
| 22 | epoxy methacrylate from biphenol A epoxy (epoxy: 190 g/eq) and methcarylic acid (1.5) | TBAF (0.132) DBSn (0.013) BPTC (0.077) | 190 | 7.8 |

TBAF: tetra-n-butylammonium fluoride
DBSn: dibutyltin dilaurate
BPTC: 1,1-di-t-butylperoxy-3,3,5-trimethylcyclohexane

EXAMPLE 23

A carbodiimide-modified 4,4''-diphenylmethane diisocyanate (isocyanate equivalent: 6.90×10$^{-3}$ equivalent/g) 750 g was used as liquid A. Separately, 105 g of styrene, 240 g of a polyether polyol 7:3 weight ratio mixture of a polyether polyol which was prepared by addition polymerization of ethylene oxide onto the terminal hydroxyl groups of glycerol and which had an OH value of 56 mg KOH/g, and another polyether polyol which was prepared by addition polymerization of ethylene oxide onto the terminal hydroxyl group of polypropylene polyether polyol and which had an OH value of 280 mg KOH/g, and 0.5 g of tetra-n-butylammonium fluoride, 0.1 g of dibutyltin dilaurate, and 0.38 g of 1,1-di-t-butylperoxy-3,3,5-timethylcyclohexane were dissolved to prepare liquid B.

The liquids A and B which previously had been vacuum-degassed, were passed through a pipe equipped with a static mixer to effect mixing In the pipe and forced with a pressure into a mold with a cavity measuring 38 cm×48 cm×3 mm in which 22 sheets of glass fiber plain weave fabrics (unit weight: 195.6 g/m$^2$) were placed. The pressure needed for resin introduction was 5.1 kg/cm$^2$ and this means that low-pressure injection is possible. After completion of resin introduction, the mold temperature was raised up to 70° C. and the mold release was conducted after 30 minutes to give a glass fiber-reinforced composite material. The material was further post-cured at 150° C. for 2 hours.

The plate was found to have a notched Izod impact strength of 130 kg·cm/cm. The plate was cut into test pieces 12.7 mm wide and 60 mm long and the pieces were subjected to the three-point bending test of 48 mm span and 2 mm/minute head speed by means of a 30 ton universal testing machine (Orientec UCT-30) and the flexural strength and the flexural modulus were found to be 51 kg/mm$^2$ and 2990 kg/mm$^2$, respectively.

These results suggest that the resin compositions according to the present invention have excellent moldability and can produce composite materials of high fiber content because of good moldability and the composite materials have excellent mechanical properties such as flexural properties.

EXAMPLE 24, 25

Prescribed amounts of polyisocyanates listed in Table 5 were used as liquid A. Separately, 14 g of styrene, 32 g of a polyether polyol 7:3 weight ratio mixture of a polyether polyol which was prepared by addition polymerization of ethylene oxide onto the terminal hydroxyl groups of glycerol and which had an OH value of 56 mg KOH/g, and another polyether polyol which was prepared by addition polymerization of ethylene oxide onto the terminal hydroxyl group of polypropylene polyether polyol and which had an OH value of 280 mg KOH/g, and 0.082 g of tetra-n-butylammonium fluoride, 0.013 g of dibutyltin dilaurate and 0.072 g of 1,1-di-t-butylperoxy-3,3,5-trimethylcyclohexane were dissolved to prepare liquid B.

The liquids A and B which previously had been vacuum-degassed, were passed through a pipe equipped with a static mixer to effect mixing in the pipe and introduced into a mold of 3 mm-thick cavity which was heated up to 100° C. The product was taken out of the mold to give a molded plate of 3 mm thickness. The plate was post-cured at 150° C. for 2 hours.

The plate was tested with a HDT & VSP tester (TOYO SEIKI Japan) and the HDT and the notched Izod impact strength (N.I.) are given in Table 5. These data reveal that cured resins have high heat resistance and high toughness.

TABLE 5

| Example No. | Polyisocyanates (g) | HDT (°C.) | N.I. (kg · cm/cm) |
|---|---|---|---|
| 24 | tolylene 2,4-diisocyanate (38) tolylene 2,6-diisocyanate | 166 | 4.8 |
| 25 | polymethylenepolyphenyl-polyisocyanate (viscosity: 149 cp/25° C.) isocyanate equivalent: 7.14 × 03$^{-3}$ equiv./g (110) | 160 | 4.5 |

EXAMPLE 26, 27

One hundred (100) grams of carbodiimide-modified 4,4'-diphenylmethanediisocyanate (isocyanate equivalent: 6.90×10$^{-3}$ equiv./g) were used as a liquid A. Separately, 14 g of styrene, prescribed amonts of polyols listed in Table 6, 0.082 g of tetra-n-butylammonium fluoride, 0.013 g of dibutyltin dilaurate and 0.072 g of 1,1-di-t-butylperoxy-3,3,5-trimethylcyclohexane shown in Table 6 were dissolved to prepare liquid B.

The liquids A and B which previously had been vacuum-degassed, were passed through a pipe equipped with a static mixer to effect mixing in the pipe and introduced into a mold of 3 mm-thick cavity which was heated up to 100° C. The product was taken out of the mold after 1 hour to give a molded plate of 3 mm thickness. The plate was post-cured at 150° C. for 2 hours.

The plates were tested with a HDT & VSP tester (TOYO SEIKI Japan) and the HDT and the notched Izod impact strength (N.I.) are given in Table 6. These data reveal that the cured resins have high heat resistance and high toughness.

TABLE 6

| Example No. | Polyol (g) | HDT (°C.) | N.I. (kg · cm/cm) |
|---|---|---|---|
| 26 | a polyol from addition of propylene oxide onto the terminal hydroxyls of bisphenol A with an OH value of 114 mg KOH/g (35) | 171 | 4.9 |
| 27 | a polyol from addition of propylene oxide then ethylene oxide onto bisphenol A with an OH value of 215 mg KOH/g (20) | 173 | 4.4 |

We claim:

1. A plural liquid pack type heat-curable resinous composition comprising a combination of:

liquid a containing at least one of a polyisocyanate compound (a), and liquid B containing at least one of a radically polymerizable unsaturated monomer (b) bearing no functional group reactive with an isocyanate group, at least one of a polyol compound (c) bearing no radically polymerizable unsaturated bond, and at least one of a ring-forming catalyst (d) for forming an isocyanurate ring, wherein at least one of a radical catalyst (e) is included in the liquid A and/or the liquid B, wherein the hydroxyl group of the polyol compound (c) is present in a range of from 5 to 75 equivalents per 100 equivalents of the isocyanate group in the polyisocyanate compound (a) and the radically polmerizable unsaturated monomer (b) is present in a range of from 5 to 150 parts by weight per 100 parts by weight of the total amount of the polyisocyanate compound (a) and the polyol compound (c).

2. The resinous composition as claimed in claim 1, wherein the polyisocyanate compound (a) is an aromatic isocyanate.

3. The resinous composition as claimed in claim 1, wherein the polyisocyanate compound (a) in the liquid A is selcted from the group consisting of 2,4-tolylene diisocyanate, 2,6-tolylene diisocyanate, 4,4'-diphenylmethane diisocyanate, 3,4'-diphenylether diisocyanate, 4,4'-diphenylether diisocyanates, 1,5-naphthalene diisocyanate, meta-xylene diisocyanate, para-xylylene diisocyanates, polyphenylene-polymethylene polyisocyanate, carbodiimide-modified 4,4'-diphenylmethane diisocyanate, and terpolymers of diisocyanate compounds having at least one isocyanurate ring structure.

4. The resinous composition as claimed in claim 1, wherein the radically polymerizable unsaturated monomer (b) is represented by the formula (I-1)

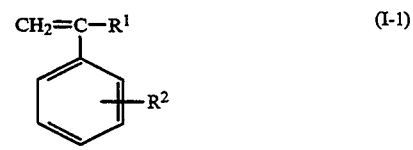

(I-1)

wherein
$R^1$ is a hydrogen atom or a methyl group,
$R^2$ is a hydrogen or atom, an alkyl group of 1 to 4 carbon atoms, a halogen atom.
and/or formula (I-2)

(I-2)

wherein
$R^3$ is a hydrogen atom or a methyl group, and

R⁴ is an alkyl group of 1 to 20 carbon atoms or a tetrahydrofurfuryl

5. The resinous composition as claimed in claim 1, wherein the ring-forming catalyst (d) for forming an isocyanurate ring in the liquid B comprises at least one member selected from the group consisting of tertiary amine compounds, imidazole compounds, morpholine compounds, hexahydro-s-triazine compounds, diazabicyclo compounds and quaternary ammonium salt compounds.

6. The resinous composition as claimed in claim 1, wherein the radical catalyst (e) in the liquid(s) A and/or B comprises at least one member selected from the group consisting of organic peroxide compounds and organic azo compounds.

7. A process for producing a shaped resin article from the plural liquid pack type heat-curable resin composition as claimed in claim 1 comprising the steps of:
 mixing the liquid A with the liquid B to provide a liquid resinous mixture;
 immediately feeding the liquid resinous mixture into a mold;
 heat-curing the liquid resinous mixture in the mold; and
 taking the resultant shaped resin article out of the mold.

8. The process as claimed in claim 7, wherein the heat curing step is carried out in an inert gas atmosphere.

9. The process as claimed in claim 7, wherein the liquid resinous mixture is fed into the mold in which a reinforcing material is placed and the resinous mixture is cured to give a composite material.

* * * * *